US012503350B2

(12) United States Patent
Roesner

(10) Patent No.: US 12,503,350 B2
(45) Date of Patent: Dec. 23, 2025

(54) APPARATUS AND METHOD FOR REMOVING AN INTERNAL CLOSURE FROM A CONTAINER

(71) Applicant: John Franklin Roesner, Indianapolis, IN (US)

(72) Inventor: John Franklin Roesner, Indianapolis, IN (US)

( * ) Notice: Subject to any disclaimer, the term of this patent is extended or adjusted under 35 U.S.C. 154(b) by 0 days.

(21) Appl. No.: 18/693,174

(22) PCT Filed: Sep. 20, 2022

(86) PCT No.: PCT/US2022/044074
§ 371 (c)(1),
(2) Date: Mar. 19, 2024

(87) PCT Pub. No.: WO2023/044141
PCT Pub. Date: Mar. 23, 2023

(65) Prior Publication Data

US 2025/0128931 A1 Apr. 24, 2025

Related U.S. Application Data

(60) Provisional application No. 63/246,020, filed on Sep. 20, 2021.

(51) Int. Cl.
*B67B 7/04* (2006.01)

(52) U.S. Cl.
CPC .................................. *B67B 7/0423* (2013.01)

(58) Field of Classification Search
CPC ............................ B67B 7/0423; B67B 7/0441
See application file for complete search history.

(56) References Cited

U.S. PATENT DOCUMENTS 1,273,076 A 7/1918 Brown
5,079,975 A 1/1992 Spencer, Jr.
(Continued)

FOREIGN PATENT DOCUMENTS

WO WO-03084858 A1 * 10/2003 ........... B67B 7/0429

OTHER PUBLICATIONS

Best 3 Pack Replacement Corkescrew Spiral/Worm for KAYCROWN and BestUtensils Wine Opener. Product Datasheet [online], Amazon Aug. 22, 2017 [retrieved on Jan. 10, 2023]. Retrieved from the internet URL: https://www.amazon.com/Replecement-Corkscrew-Sprial-Rabbit-BestUtensils/dp/B07528NJsZ?th=1.
(Continued)

*Primary Examiner* — Daniel Jeremy Leeds
(74) *Attorney, Agent, or Firm* — Michael A. Pugel

(57) ABSTRACT

An apparatus and method for removing an internal closure from a container are described. The method and apparatus include inserting an extracting mechanism into an internal closure located in an opening of a container, the extraction mechanism attached to a handle, the handle being positioned above the opening. The method and apparatus further include applying a first force to the handle in a direction towards the container, the first force being sufficient for the extraction mechanism to break the internal closure-container bond by advancing the internal closure into the container. The method and apparatus further include applying a second force to the handle in a direction opposite the first force, the second force allowing the extraction mechanism to extract the internal closure from the container.

17 Claims, 8 Drawing Sheets

(56) References Cited

U.S. PATENT DOCUMENTS

| | | | | |
|---|---|---|---|---|
| 2013/0319179 | A1* | 12/2013 | Colman | B26B 11/00 81/3.09 |
| 2020/0165113 | A1 | 5/2020 | Patrizio | |

OTHER PUBLICATIONS

KAYCROWN Professional Wine Opener, Vertical Lever Corkscrew with Built in Foli Cutter, Manual Handheld Corkscrew with Ergonomic Lever Pump. Product Datasheet [online], Amazon Dec. 20, 2016 [retrieved on Mar. 15, 2024]. Retrieved from the internet URL: https://www.amazon.com/KAYCROWN-Professional-Opener-Corkscrew-Premium/dp/B01NBMMJJG.

* cited by examiner

APPARATUS AND METHOD FOR REMOVING AN INTERNAL CLOSURE FROM A CONTAINER

This application claims the benefit, under 35 U.S.C. § 365 of International Application PCT/US2022/044074, filed Sep. 20, 2022, which was published in accordance with PCT Article 21(2) on Mar. 23, 2023, in English and which further claims the benefit of priority U.S. provisional application 63/246,020, filed on Sep. 20, 2021.

TECHNICAL FIELD

The present disclosure generally relates to the field of the opening of a container. The present disclosure more specifically relates to the removal, by extraction, of an internal closure from an opening in a container.

BACKGROUND

Any background information described herein is intended to introduce the reader to various aspects of art, which may be related to the present embodiments described below. This discussion is believed to help provide the reader with background information to facilitate a better understanding of the various aspects of the present disclosure. Accordingly, it should be understood that these statements are to be read in this light.

The use of an internal closure, also known as a stopper or cork, to contain and/or protect the contents of a container (also known as a vessel or bottle) has been a practice used for centuries. Distinct from an external closure, also referred to as a lid or cap, internal closures interface with the container by being inserted within the opening (typically located at the top).

When in place and functioning as a closure, stoppers may have an extruding portion that juts outside the container, which can be grasped to aid removal when opening the container. However, for this discussion, the terms internal closure, stopper, and cork will refer only to those designed to be put completely within the neck of a container (at or below the outermost part of the opening), requiring a device to assist removal. A novel technology for such devices will be described.

Compressible and elastic stoppers that are relatively impermeable to liquid have been made using various materials, including, but not limited to, natural materials, such as tree cork (with and without added materials) and, more recently, synthetic materials, such as flexible plastic. Uniformly, they maintain secure closure by creating a bond with the container, referred to as a "seal", as cork does within a glass bottle.

The simplest device often used for removing a cork or flexible plastic stopper traditionally involves the use of a screw-type device, also known as a worm, which is affixed to some kind of handle mechanism and is inserted into the stopper. Removal using a nominal screw type device may be described as a two-step process that first involves applying a twisting force to a handle to turn a worm that is at the end of a shank attached to the handle, advancing the worm into the stopper and gaining hold. After the worm has been advanced into the stopper, gaining hold, a pulling force is applied to break the stopper-container seal and pull the stopper out of the container, thereby "opening" the container. The pulling force may be applied using the handle or some other mechanism, such as a lever or other force multiplier.

In this two-step process, the greatest force requirement is for the breaking of the seal. Importantly, the strength of the stopper-container bond increases over time, while the structural integrity of the stopper may diminish. As a consequence, the force required to break this seal may create problems, including fracturing or splitting the stopper (leading to particulates fouling the contents of the container and/or failure to remove the stopper), spillage, vessel breakage, and injury to persons or property.

Several methods and techniques have been created to improve upon this approach to opening containers sealed with internal stoppers or closures. In many cases, these methods or techniques are intended to ease the breaking of the seal and/or reduce the risk of negative consequences as part of removing the stopper. One very early approach to breaking the stopper-container bond included adding a fixed disc or button to the shaft between the handle and the worm. The worm could only be advanced into the stopper to the point at which the disc engaged the lip of the container. Further turning of the worm causes the cork to be compressed and begin to turn in the neck of the container, thus breaking the seal before applying the extraction force to remove the cork. Later advances have used other mechanisms to assist with the application of force, either rotational or pulling, to break the seal, or provide better control of the application of that force. Another, entirely different, method or technique to break the seal is via a mechanical disruption achieved by use of a device that is inserted between the stopper and the inner surface of the container. Such a device is often referred to as a two-prong cork-puller, a twin-prong cork-puller, a butler's friend, or an Ah-So. However, this type of device is considered generally less desirable and/or requires greater practice and skill than a screw-type removal device. This type of device also has the added risk of pushing the stopper past the neck and into the body of the container.

As none of these advances have eliminated the above-described problems, a recent development has been the use of a combination of a screw-type and two-prong puller (e.g., the Durand®) that is both expensive and technically complicated for the user. As a result, there remains a need for an improved technique for breaking the seal between the internal closure or stopper and the container or container that is both simpler and more reliable and thus a better way to remove an internal closure from a container.

SUMMARY

According to one implementation, an apparatus is described. The apparatus includes a handle and a fulcrum, the fulcrum mechanically coupled, at one end, to one end of the handle through a pivot point, the pivot point having rotational freedom along an orthogonal axis between the handle and fulcrum. The apparatus further includes an internal closure extraction mechanism mechanically coupled to the handle, the internal closure extraction mechanism configured to extract an internal closure out of an opening in a container when a force is applied to the handle in a direction away from the opening in the container, the internal closure sealing the container after the container is filled with material. The fulcrum includes a container hold mechanism, the container hold mechanism configured to provide purchase on the container, allowing a force to be applied to the handle in a direction to advance the internal closure into the container prior to extracting from the container.

According to an implementation, a method is described. The method includes inserting an extracting mechanism into an internal closure located in an opening of a container, the extraction mechanism attached to a handle, the handle being positioned above the opening. The method additionally includes applying a first force to the handle in a direction towards the contains, the force allowing the extraction mechanism to advance the internal closure into the container. The method further includes applying a second force to the handle in a direction opposite the first force, the second force allowing the extraction mechanism to extract the internal closure from the container.

BRIEF DESCRIPTION OF THE DRAWINGS

The above and other aspects, features, and advantages of the present disclosure will become more apparent in light of the following detailed description when taken in conjunction with the accompanying drawings to which the principles of the present disclosure are applicable.

DETAILED DESCRIPTION

Figure 1:
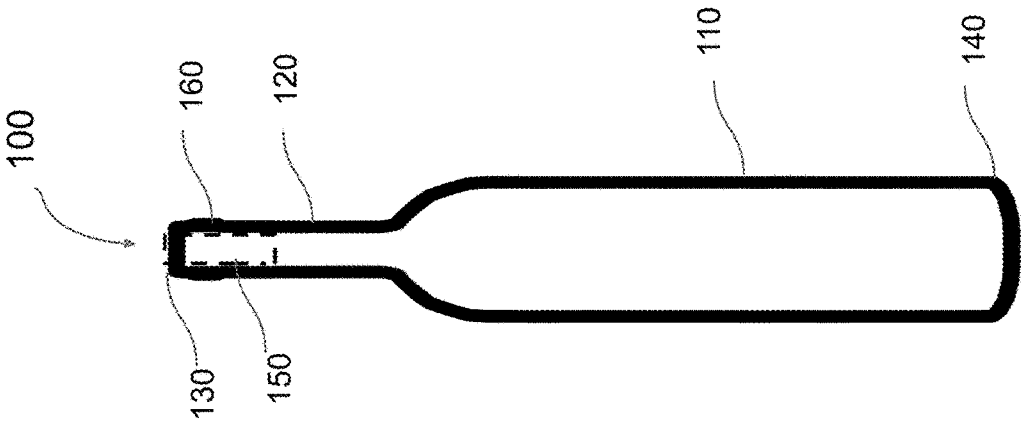
FIG. 1 shows an exemplary container that may be used in conjunction with aspects of the present disclosure.

The present description illustrates the principles of the present disclosure. It will thus be appreciated that those skilled in the art will be able to devise various arrangements which, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the embodiments hereof, any element expressed or described, directly or indirectly, as a means or mechanism for performing a specified function is intended to encompass any way of performing that function including, for example: a) a simple machine; b) a combination of simple machines and/or complex or automatic mechanisms; or c) a simple machine and/or complex or automatic mechanisms that are electrically or electronically assisted. The disclosure, as defined by such claims, resides in the fact that the functionalities provided by the various recited means are combined and brought together in the manner which the claims call for. It is thus regarded that any means that can provide those functionalities are equivalent to those shown herein.

The present embodiments address issues associated with removing the internal closure or stopper from a container. Using the example of cork in a bottle, these nominal techniques include (1) gaining purchase or hold of the cork, (2) applying enough leverage and force to break the seal between their cork and the bottle while pulling the cork out of the bottle. These nominal techniques may rely on manipulating the cork by turning or spinning it in place or pulling on it, in order to accomplish the most force-intensive aspect of removing internal closure, breaking the internal cork-bottle seal. These nominal techniques require significant mechanical force to be applied to the cork, which requires human strength or complex mechanical and/or powered technology and devices. In some cases, the sudden release or exit of the cork from the bottle may cause an uncontrolled application of force to dangerously accelerate the cork or the bottle itself. Further, the application of pulling force or turning force as part of breaking the seal may result in a damaged cork. Damage to the cork may also occur due to inconsistent application of force by the device design, placement of the device used to remove the cork when inserted into the cork, or faulty or unreliable cork material due to inherent characteristics and/or the differential effects of the internal portions of the cork being exposed to the contents of the bottle and/or air outside it.

The present embodiments are directed to the extraction of an internal closure, such as a cork or stopper, from a container, such as a bottle, using an application of force in the direction of advancing the internal closure further into a container to break the internal closure-container seal. The advancement of the internal closure may be referred to as pushing the cork or stopper. The advancement of the internal closure may be performed by applying force to an extraction mechanism attached to a handle that has been inserted into the internal stopper, such as a worm, corkscrew, or screw-shaped element. In some instances, the extraction mechanism may include a ram that is positioned to rest on the top surface of the internal closure. Also, the container may easily be braced against the direction of the force, providing better control. Once the internal closure advances a small distance into the container and the seal is broken, the internal closure can be pulled or extracted from the container using any one of several nominal methods or techniques.

The present embodiments describe an internal closure removal apparatus and method that includes additional mechanisms to break the seal between the internal closure and the inner surface of a container by applying force to the internal closure in the direction of advancing the internal closure into the container before pulling the internal closure out of the container. The container may be braced against the direction of the force, providing better control. For instance, a fulcrum attached to the handle may be engaged against the container to provide purchase or a hold on the container. The embodiments may also include a mechanism that allows for bracing of the fulcrum against a portion of the neck of the container. The embodiments may include another mechanism, referred to as a ram, which includes a pushing surface added to the extraction mechanism, such as the shaft above the worm of a screw-type device. The pushing surface is positioned in contact with the internal closure and enables a more uniform application of force to the surface of the internal closure as part of advancing the internal closure into the container to break the internal closure-container seal. The pushing surface further prevents or minimizes damage, such as avulsion, fracturing, or splitting, to the internal closure due to the force applied through the extraction mechanism. The use of either one or both of these mechanisms improves control of the force and provides a force multiplier by creating a mechanical connection from internal closure to the container.

The present embodiments illustrate the use of two different elements to apply the technique of advancing the internal closure into the container as a way to break the seal between the internal closure and the container as part of extracting the internal closure from the container. These two elements, a container grasping mechanism, such as a push lock, and an internal closure push mechanism, such as a ram, may be used individually, or in combination, to assist with the advancing technique. For instance, one or more of the present embodiments illustrate or use a device similar to a lever corkscrew that employs a push lock and a fixed ram. In some other embodiments, a lever corkscrew may include a push lock without a fixed ram. However, it is worth noting that only one or the other element may be used to apply the same technique depending on the type of internal closure extraction device or approach that is employed. In some embodiments, a ram, whether affixed to or detachable from the device, may be used in conjunction with a single-handle corkscrew that does not utilize a push lock. In still other embodiments, one or both of the push lock and ram may be used with a device similar to the waiter's corkscrew. And in yet other embodiments, one or both of the push lock and ram may be implemented as part of an automatic, mechanized, or electro-mechanical container opener.

Turning to FIG. 1, an exemplary container 100 that may be used in conjunction with aspects of the present disclosure is shown. Container 100 is cylindrical in shape and has a lower structure 110 for storing liquid and an upper structure 120, often referred to as the neck. The upper structure 120 has an opening 130 at the top of the upper structure 120. The opening 130 has a shape that can facilitate both insertion and removal of the liquid, such as a circular shape. The lower structure 110 includes a base 140 at the bottom of the lower structure 110. The base 140 is circular in shape and may be flat or have a flat region so that the container can stand up with the opening 130 oriented to be at the top of container 100. The upper structure 120 may taper to a narrower cylindrical shape to accommodate the insertion of an internal closure 150 and to facilitate removal of the liquid by tipping the container at an ever-increasing angle past a horizontal plane of the central axis of the container. The container also includes an extrusion near the opening 130 that forms a collar 160. The collar 160 may also be referred to as a string rim, lower part skirt, or ring. The collar 160 contributes to the strength of the container and may also serve additional purposes in manufacturing (e.g., gripping the container neck with a clasp) and closure of the container after initial filling with liquid. The collar 160 may also be the area of contact with the container required for a machine or device used for removing an internal closure from a container, such as will be described in more detail below.

It is worth noting that container 100 described in FIG. 1 may be made of several different materials, including glass, plastic, aluminum, steel, and the like. The thickness of the material may vary depending on type of material used, type of material of liquid inserted in container 100, or other aesthetic details. In some embodiments, container 100 may be made out of glass with a thickness varying from 1 millimeter (mm) in the lower structure 110 to 3 mm in the upper structure 120 to 4 mm in the base 140. Further, the shape shown for the container 100 is only one of many possible shapes for a container. In some embodiments, the container 100 may be a glass bottle used for holding a liquid, such as wine. The internal closure 150 may be a cork that is made from a soft natural and/or synthetic material. The aspects of the present disclosure should not be construed as being limited only to the shape of, or material used for, the container 100 or shape of, or material used for, the internal closure 150 as described herein.

As part of using container 100, the internal closure 150 is removed from the container 100 using an internal closure removal device (not shown). A handle of the internal closure removal device is positioned above the internal closure 150 that is located in the opening 130. An internal closure extraction mechanism is attached to the handle. A force is applied to the handle in a direction toward container 100, allowing the extraction mechanism to advance or push the internal closure 150 into the container 100. The force applied by the handle towards the container 100 is used to break the seal or bond that has been created between the internal closure 150 and the inner surface of container 100. The bond or seal is created as a result of the original process of filling the container 100 and inserting the internal closure 150 in the opening 130 to seal the container 100. After the internal closure 150 has been advanced, a second force is applied to the handle in the opposite direction of the first applied force and away from the container 100 to extract the internal closure 150 from the opening 130. Aspects of the internal closure removal device along with the internal closure removal process will be described in further detail below.

Figure 2:
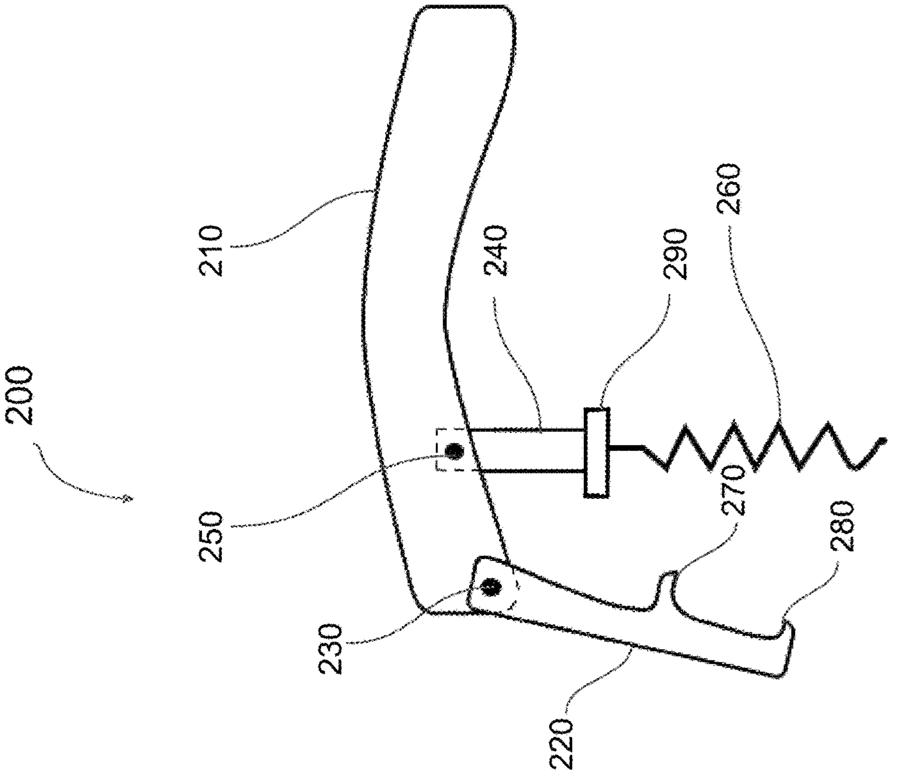
FIG. 2 is a perspective view of an exemplary embodiment of an internal closure removal device according to aspects of the present disclosure.

Turning to FIG. 2, a perspective view of an exemplary embodiment of an internal closure removal device 200 according to aspects of the present disclosure is shown. The internal closure removal device in FIG. 2 may also be referred to as a type of corkscrew device. The internal closure removal device 200 may be used in conjunction with a container that includes an internal closure, such as container 100 including an internal closure 150 described in FIG. 1. The internal closure removal device 200 includes a handle 210 connected at one end to one end of a fulcrum 220 through a pivot point 230. Handle 210 also connects to the shank at one end of a shaft 240 through a hinged connection 250 located within the body of handle 210. In some embodiments, the hinged connection 250 may be located near the midpoint or mid-section of handle 210. The shaft 240 may be flattened or otherwise have a shape that allows for a fixed and stable connection and positioning through the hinged connection 250 to the handle 210 such that the connection or positioning will not be altered by the application of rotational force during use. The shaft 240 extends from its shank and forms a worm 260 at its other end. The worm 260 has a sharp point at its end opposite the end where the worm 260 is formed at the shaft 240. Once the sharp end of the worm 260 is turned into the internal closure (e.g., internal closure 150 in FIG. 1), gaining purchase, the shaft 240 acts as the point of coupling between the worm 260 and handle 210 when an additional force is applied to manipulate the internal closure inward and outward as part of removing it from the container (e.g., container 100).

It is worth noting that handle 210, fulcrum 220, and shaft 240 are preferably constructed out of a material capable of withstanding the force necessary for the process of removing an internal closure (e.g., internal closure 150 in FIG. 1) from a container (e.g., container 100). Such materials include, but are not limited to, stainless steel, carbon steel, fiberglass, and wood. Further, although handle 210, fulcrum 220, and their associated details and elements are illustrated as two-dimensional, these elements and details are generally three-dimensional in shape, having a thickness and/or width that facilitates ease of handling by the user as well as efficiency of operation during the internal closure removal process. In some embodiments, fulcrum 220 may be made out of flat plate steel that is bent into a U-shape that has two parallel sides with identical details allowing two points of contact with a container. The handle 210 may be made from a laminate of plate steel and wood or plastic, also having a U-shape. The shaft 240 and worm 260 may be pivoted at hinged connection 250 to fold into the U-shaped region of handle 210. Further, the width of fulcrum 220 may be greater than the width of handle 250, allowing fulcrum 220 to be folded at pivot point 230 over handle 210 for convenient storage. In other embodiments, elements of internal closure removal device 200 may be formed in three dimensions in a manner different from that described herein.

Fulcrum 220 includes a pulling notch 270 positioned along the edge of the fulcrum 220 that is positioned nearest to the container (e.g., container 100 in FIG. 1). The pulling notch 270 may also be referred to as a bootlever. The pulling notch 270 allows leverage to be applied on the top surface, or lip, of the opening (e.g., opening 130) at the top of the container when extracting, or pulling, the internal closure. As illustrated, the pulling notch 270 is implemented or formed as a notch or step in the material used for the fulcrum 220. The step has a proportion such that the lower edge of the step engages the top surface or lip of the opening. In other embodiments, more than one pulling notch or bootlever, similar to pulling notch 270, may be included on the fulcrum 220 at different locations to allow leverage when handle 210 is in different positions. The additional pulling notches may be implemented or formed in a manner similar to pulling notch 270.

The fulcrum 220 also includes a push lock 280 positioned along the edge of the fulcrum 220 that is intended to be nearest to the container (e.g., container 100 in FIG. 1). The push lock 280, which may also be referred to as a collar grasp, provides purchase, hold, or grasp on the collar (e.g., collar 160) of a container as part of creating downward leverage with the internal closure removal device (e.g., internal closure 150) and break the seal. The illustration in FIG. 2 shows a notch-style structure similar to the structure for the pulling notch 270 to catch on the bottom edge of the collar on the container. Other embodiments may be larger, multipoint, or of a different conformation (e.g., a partial or complete ring around the container).

In FIG. 2, the push lock 280 is shown located further from the pivot point 230 than the pulling notch 270, with the push lock 280 located at or near one end of the fulcrum 220 and the pulling notch located somewhere in the middle of the fulcrum 220. In this arrangement, the distance between push lock 280 and pulling notch 270 may be no less than the vertical distance between the lower edge of the collar (e.g., collar 160 in FIG. 1) and the top or lip of the opening (e.g., opening 130 in FIG. 1) of the container (e.g., container 100) in order to allow the push lock 280 and pulling notch 270 to operate properly when engaged with the container. In one embodiment, push lock 280 may be located 35.4 mm away from pivot point 230. Further distance from push lock 280 and the pulling notch 870 is 25.4 mm. In other embodiments, the relative position of the push lock 280 and pulling notch 270 may be different and may even be reversed in relative location or distance with respect to the pivot point 230.

The addition of the push lock 280 to fulcrum 220 is advantageous to the process of breaking the internal closure-container seal with the advancement of the internal closure (e.g., internal closure 150 in FIG. 1) into the container (e.g., container 100). The push lock 280 allows self-bracing, as part of creating a mechanical connection to the container, while applying the downward force to advance the internal closure into the container and break the seal between the internal closure and the container. The push lock 280 further improves control of the force and manages the force multiplication of the handle 210 and fulcrum 220 through the pivot point 230.

As shown in FIG. 2, the shaft 240 includes a ram 290 attached to the shaft 240 at a point near where the point where the worm 260 begins to be formed. The ram 290, which may also be referred to as a cork ram or cork push, is affixed to the shaft 240 above the worm 260. As illustrated, the ram 290 is shaped similarly to a flat surface button smaller in diameter than the inner diameter of the opening (e.g., opening 130 in FIG. 1) at the top of the container (e.g., container 100). The inclusion of the ram 290 is advantageous to the process of breaking the entirety of the internal closure-container seal by engaging the top surface of the internal closure. When the worm 260 is driven fully into the internal closure, the ram 290 rests against the top of the internal closure. The use of a button shape for ram 290 provides a broad surface to apply the downward force generated through the handle 210, fulcrum 220, and push lock 280 engaged with the bottom of the collar (e.g., collar 160) of a container, as described above. As such, the addition of the ram 290 can improve the basis for the directional pressure against the internal closure to eliminate or minimize damage (such as shredding, fracturing, or avulsion) to the internal closure.

It is worth noting that the internal closure removal device in FIG. 2 is described as having a ram 290 that is affixed to the shaft 240 and having a flat button shape. In other embodiments, other shapes may be used and provide similar effect, including shapes that are more narrowly configured to allow the ram 290 to fit within the handle 210 when the internal closure removal device is folded closed. Any designed protrusion from the shaft 240 intended to prevent further advancement of the worm 250 by engagement of the internal closure with an interface that does not extend beyond the opening (e.g., opening 130 in FIG. 1) of the container (e.g., container 100) may be used to assist in the force used to break the seal between the internal closure and container by pushing. Additionally, in some embodiments, the ram 290 may be removable or detachable to the shaft 240 as a standalone component. In this instance, ram 290 may be referred to as a free ram or free cork ram. In some embodiments, a ram, such as ram 290, is not included with internal closure removal device 200.

Further, in some embodiments, the ram 290 may include an insertion limiting element, or limiter, which extends further outward beyond the diameter of the opening (e.g., opening 130 in FIG. 1) of the container (e.g., container 100) and at a different height relative to the upper surface of the central portion of ram 290. The insertion limiting element, or limiter, included on ram 290 provides a stop mechanism preventing the ram 290 from pushing the internal closure (e.g., internal closure 150) farther into the neck (e.g., upper structure 120) of the container than is necessary to break the seal between the internal closure and the container. For example, the lower surface of ram 290 engages the internal closure to initially apply downward pressure to break the seal between the internal closure and the container when a force is applied through handle 210 to worm 260. Once the seal is broken by the application of downward pressure, the subsequent downward movement of the internal closure may be stopped or limited once the outward extension of the ram 290 engages the upper surface of the opening (e.g., opening 130). In this manner, the movement or advancement of the internal closure into the neck is limited. Additional details regarding the configurations of a ram similar to ram 290 will be described below.

It is worth noting that push lock 280 illustrated in FIG. 2 is one embodiment of a type of container (e.g., container 100 in FIG. 1) hold mechanism that may be used in conjunction with facilitating the advancement of the internal closure (e.g., internal closure 150) into the container. In some embodiments, a set of hinged grips attached to the fulcrum 220 that wrap around all, or a portion, of the container may be used in place of push lock 280. The hinged grips may be adjusted to grip the collar (e.g., collar 160) or a different section of the container in order to provide additional leverage as part of applying the downward pressure on handle 210. In other embodiments, a ring may be attached to the end of fulcrum 220 further from the pivot point 230 and used in place of push lock 280. The ring may be placed over the bottle until it contacts a portion of the container below the collar. The ring provides downward force or pressure on the container as part of its engagement, providing similar additional leverage as described above. Other embodiments of a container hold mechanism are also possible.

Figure 3C:
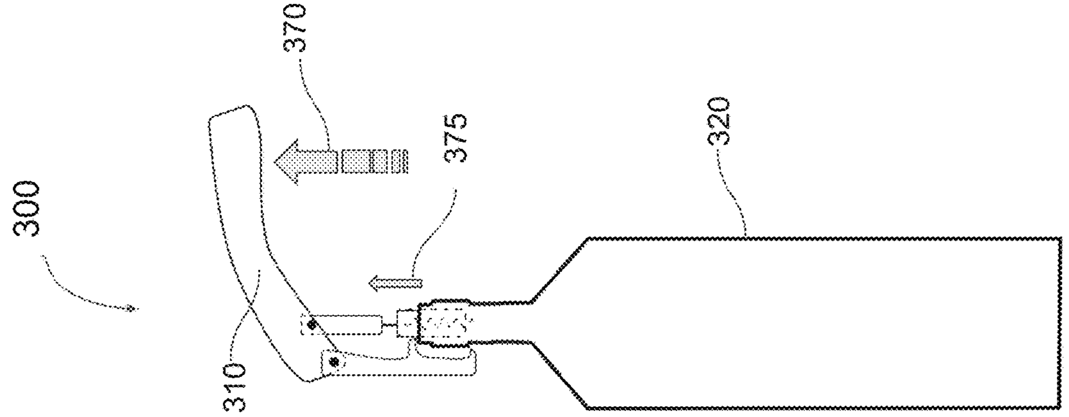
FIGS. 3A, 3B, and 3C are a set of diagrams 300 illustrating the steps of operation of the internal closure removal device, or corkscrew used as part of a process for removing an internal closure from a container according to aspects of the present disclosure.
Figure 3B:
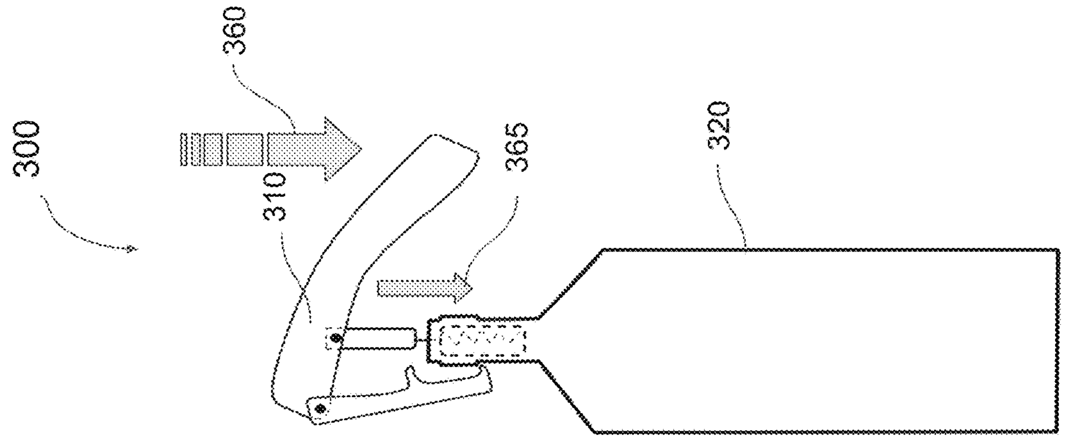
Figure 3A:
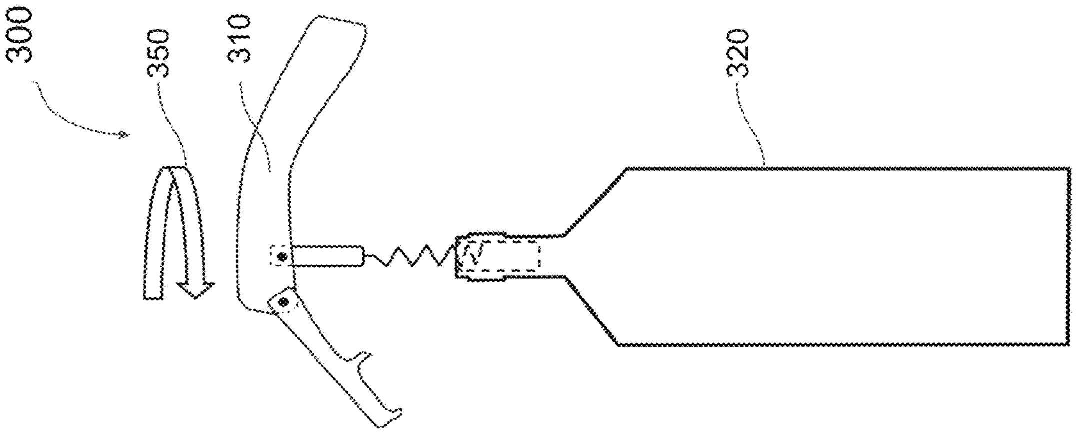

Turning to FIGS. 3A, 3B, and 3C, a set of diagrams 300 illustrating the steps of operation of the internal closure removal device, or corkscrew used as part of a process for removing an internal closure from a container according to aspects of the present disclosure, are shown. FIGS. 3A, 3B, and 3C will be described using internal closure removal device 310 which is similar to internal closure removal device 200 described in FIG. 2, and container 320 that is similar to container 100 described in FIG. 1 respectively. The steps related to FIGS. 3A, 3A, and 3C may also apply to other types or forms of containers as well as other internal closure removal devices that utilize one or more aspects of the present disclosure.

FIG. 3A illustrates the initial step associated with removing the internal closure from the container 320. The worm or corkscrew (e.g., worm 260) attached to the shaft (e.g., shaft 240) included on the internal closure removal device 310 is twisted or rotated into the internal closure (e.g., internal closure 150) by applying a force on the handle (e.g., handle 210) in a rotational motion, downward towards the container 320 and into the internal closure (e.g., internal closure 150 in FIG. 1). The rotational motion is shown as element 350. The leading edge of the worm or corkscrew is typically positioned to enter the internal closure near its center. The direction of rotation is dependent on the spiral direction of the worm. In most cases, the direction is clockwise or left-hand rotational direction. The worm or corkscrew is turned or advanced into the internal closure until it has created sufficient purchase or hold on the internal closure. As illustrated, the worm or corkscrew may be advanced until the ram touches the top surface of the internal closure. In some embodiments, such as those without a ram, the worm or corkscrew may be advanced until its leading edge is just protruding from the bottom surface of the internal closure.

FIG. 3B illustrates a further step that is carried out following the step described in FIG. 3A. The handle (e.g., handle 210 in FIG. 2) and fulcrum (e.g., fulcrum 220) on internal closure removal device 310 are adjusted using the pivot point (e.g., pivot point 230) between them as well as the hinged connection (e.g., hinged connection 250) between the handle and the shaft (e.g., shaft 240) until the push lock (e.g., push lock 280) is brought into contact or engaged with the outer surface of container 320 just below the collar (e.g., collar 160 in FIG. 1). Pressure or force is applied downward to the portion of the handle furthest from, or opposite, the pivot point while applying pressure or force to maintain engagement of the push lock on the fulcrum against the surface of the container 320 and lower edge of the collar to brace the fulcrum against container 320. The leverage created will direct a downward force through the shaft to the worm (e.g., worm 260) and ram (e.g., ram 290) resting against the internal closure. The applied force on the handle and the downward force applied through the shaft are illustrated as elements 360 and 365, respectively. When enough force is applied, the seal between the internal closure and the container will be broken and the internal closure will advance further into the upper portion (e.g., upper structure 120) of container 320. The distance need only be small. In one embodiment, a distance limited to not more than one millimeter is sufficient to allow for movement of the internal closure once the seal is broken from the inner surface of container 320. The small distance prevents any contents or material from exiting or leaking out of the container. In addition, if the internal closure is advanced too far into container 320, the internal closure may expand within the container 320, creating difficulty with extracting the internal closure through the opening (e.g., opening 130) in container 320. As described above, some embodiments may include an insertion limiting element, such as a limiter as part of a ram, to prevent the internal closure from being forced too far into the container.

FIG. 3C illustrates a further step that is carried out following the step described in FIG. 3B. The handle (e.g., handle 210 in FIG. 2) and fulcrum (e.g., fulcrum 220) on internal closure removal device (e.g., internal closure removal device 200) are adjusted using the pivot point (e.g., pivot point 230) between them as well as the hinged connection (e.g., hinged connection 250) between the handle (e.g., handle 210) and the shaft (e.g., shaft 240) until the pulling notch (e.g., pulling notch 270) is brought into contact or engaged with the top surface of container 320 around the opening (e.g., opening 130 in FIG. 1). Pressure or force is applied upward to the portion of the handle furthest from the pivot point while applying pressure or force between the fulcrum and container 320 to maintain engagement of the pulling notch against the top surface of container 320. The leverage created will direct an upward force through the shaft to the worm (e.g., worm 260). When enough force is applied, the internal closure will be moved in a direction to exit the upper portion (e.g., upper structure 120) of container 320. The applied force on the handle and the upward force applied through the shaft are illustrated as elements 370 and 375, respectively. The upward force will pull or extract the internal closure through and out of the opening (e.g., opening 130 in FIG. 1) at the top of container 320. It is worth noting that as a result of first advancing the internal closure (e.g., internal closure 150), as part of the step illustrated in FIG. 3B, less force is subsequently required to extract the internal closure in the step illustrated in FIG. 3C than if the step illustrated in FIG. 3B had not been performed. In some embodiments, the step illustrated in FIG. 3C may be carried out more than once in order to completely extract or pull out the internal closure from container 320. The step illustrated in FIG. 3C may be repeated as a result of a need to re-adjust the relative positions of the handle, fulcrum, and shaft from their first adjusted positions described above.

It is worth noting that the application of downward force to break the internal closure-container seal, as illustrated in FIG. 3B, may not require the use of both a push lock and a ram. In some embodiments, the downward pressure or force on the worm (e.g., worm 260) and the ram (e.g. ram 290) to break the internal closure-container seal may be applied to the portion of the handle (e.g., handle 210 in FIG. 1) at or near the position of the shaft (e.g., shaft 240) without the assistance of any leverage offered by the presence or use of a push lock (e.g., push lock 280) on a fulcrum (e.g., fulcrum 220) or any other leverage mechanism. In some embodiments, the pressure or force to break the internal closure-container seal will be applied to the internal closure only where the worm engages with the internal closure, without a ram to mitigate or eliminate possible damage to the internal closure, such as fracturing, splitting or avulsion.

The steps described in FIGS. 3A-3C are illustrated as being carried by a portable or handheld internal closure removal device that may be operated by a user. It is worth noting that other types of internal closure removal devices may also be used to carry out the steps described in FIGS. 3A-3C. In some embodiments, the internal closure removal device illustrated in FIG. 2 may be implemented as a stationary device instead of a portable or handheld device. In some embodiments, the internal closure removal device may be mechanized rather than operated only by a user. In some embodiments, a machine may implement elements of an internal closure removal device that includes one or more of the elements described above in FIG. 2 as part of additional processing on container 320. The machine may be stationary or movable. The machine may include one or more electrical motors used to generate the forces needed on the handle (e.g., handle 210) to advance and extract the internal closure (e.g., internal closure 150), as illustrated in FIGS. 3A-3C. The machine may further include a container hold mechanism similar to a push lock (e.g., push lock 280) or another type described above. The machine may also include a ram (e.g., ram 290) as part of an internal closure extraction mechanism similar to those described above in order to prevent or mitigate unnecessary damage to the internal closure.

Figure 4:
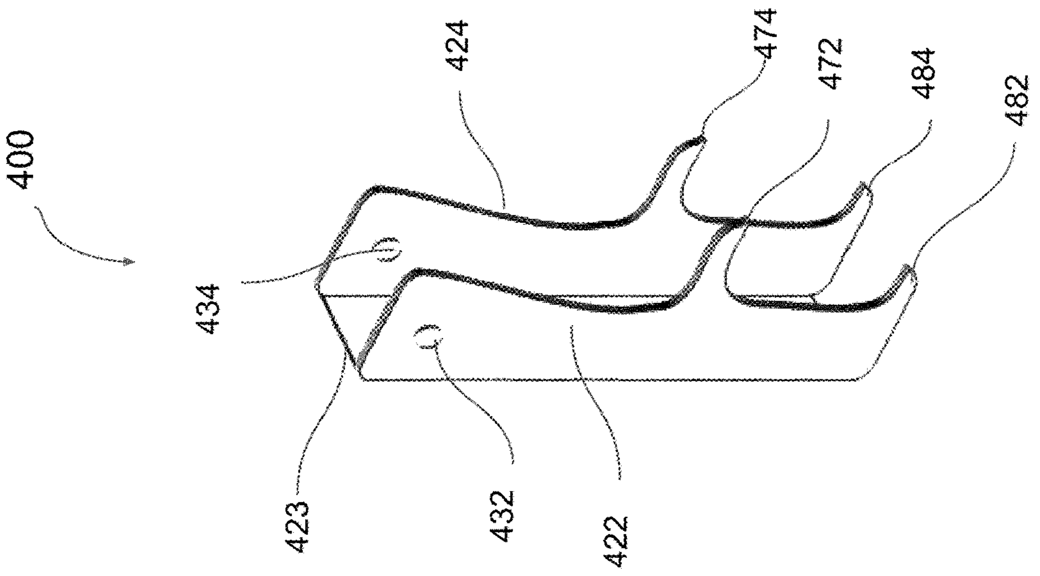
FIG. 4 is a perspective view of an exemplary embodiment of a fulcrum included as part of an internal closure removal device according to aspects of the present disclosure.

Turning to FIG. 4, a perspective view of an exemplary embodiment of a fulcrum 400 included as part of an internal closure removal device 400 according to aspects of the present disclosure is shown. Fulcrum 400 is formed and is configured in a manner similar to that described in FIG. 2. Fulcrum 400 is shown in three dimensions and is formed as a U-shape out of a plate of steel. Once formed, fulcrum 400 has a front side fulcrum portion 422, a back or rear side fulcrum portion 424, and a connecting portion 423 between the front side fulcrum portion 422 and the rear side fulcrum portion 424. The front side fulcrum portion 422 and rear side fulcrum portion 424 are identically formed symmetrical images of each other. Each fulcrum portion 422 and 424 has a circular opening 432 and 434 respectively. Openings 432 and 434 are used to attach a connection mechanism that is used as a pivot point (e.g., pivot point 230) between fulcrum 400 and a handle (e.g., handle 210). The connection mechanism may include, but is not limited to, one or more fasteners (e.g., screws, bolts, nuts, rivets), a clevis rod, a dowel pin, and the like. Each fulcrum portion 422, 424 further includes pulling notch portions 472 and 474, respectively, along with push lock portions 482 and 484 respectively. Pulling notch portions 472 and 474 are symmetrical and configured in a manner to operate in unison as pulling notch 270. Similarly, push lock portions 482 and 484 are symmetrical and configured in a manner to operate in unison as push lock 280. The mechanical structure of fulcrum 400 represents one possible embodiment of construction that may be used. Other embodiments of fulcrum 400, as well as elements of an internal closure removal device, may be constructed in another manner while still achieving similar results.

Figure 5:
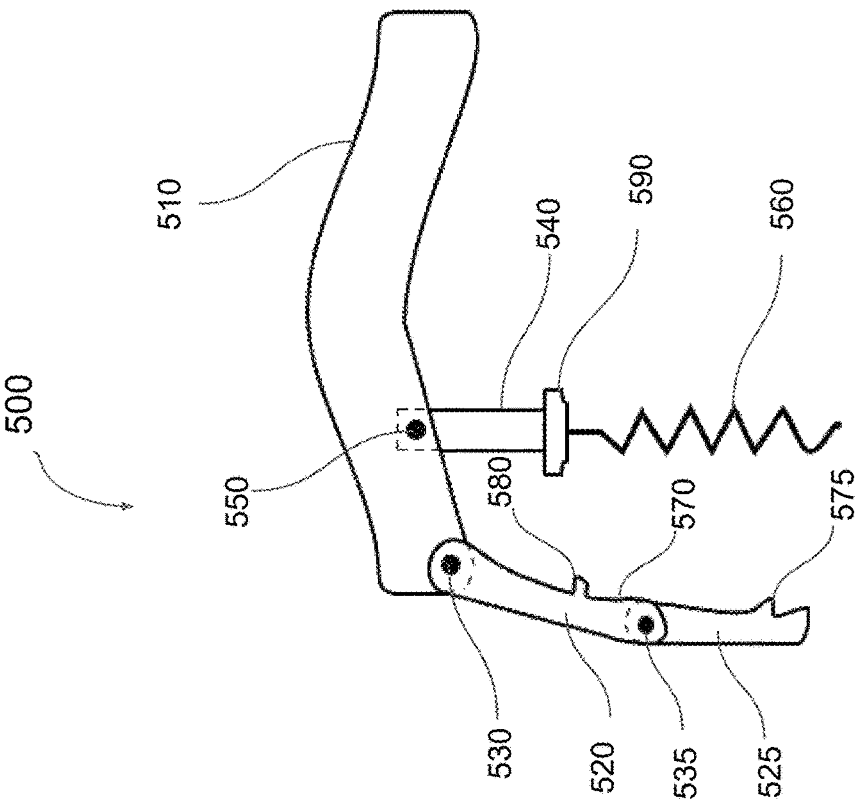
FIG. 5 is a perspective view of another exemplary embodiment of an internal closure removal device according to aspects of the present disclosure.

Turning to FIG. 5, a perspective view of another exemplary embodiment of an internal closure removal device 500 according to aspects of the present disclosure is shown. Elements 510, 530, 540, 550, 560, and 590 are located in a similar orientation and operate in a similar manner to the elements 210, 230, 240, 250, 260, and 290 described in FIG. 2 and will not be described in further detail here. In FIG. 5, the fulcrum used in FIG. 2 (e.g., fulcrum 220) is replaced by two fulcrums, upper fulcrum 520 and lower fulcrum 525, also having a pivot point 535 between them. It is worth noting that upper fulcrum 520 and lower fulcrum 525 may alternatively be described as an upper and lower portion of one fulcrum. Both upper fulcrum 520 and lower fulcrum 525 have a pulling notch, with upper pulling notch 570 included on upper fulcrum 520 and lower pulling notch 575 included on lower fulcrum 525. The combined length of upper fulcrum 520 and lower fulcrum 525 may be similar to the length of fulcrum 220 described in FIG. 2. Upper fulcrum 520 and lower fulcrum 525 may also have a position limit or lock mechanism (not shown) that operates in conjunction with pivot point 535. The position limit or lock mechanism may be used to prevent the upper fulcrum 520 and lower fulcrum 525 from exceeding a certain angular orientation between them. It is worth noting that the combination of upper fulcrum 520, lower fulcrum 525, and pivot point 535 may be referred to as an articulated lever that enables a reciprocal movement of lower fulcrum 525 with respect to upper fulcrum 520.

Further, push lock 580 is at a location along the upper fulcrum 520 closer to the handle 510 than either the upper pulling notch 570 or lower pulling notch 575. The upper pulling notch 570 is located at or near the end of upper fulcrum 520 furthest from pivot point 530. Lower pulling notch 575 is also located at or near the end of lower fulcrum 525 furthest from pivot point 530. As shown, push lock 580 and upper pulling notch 570 are implemented or formed as a part of the same notch or step, as described above. The upper edge of the notch or step is configured as push lock 580, and the lower edge is configured as upper pulling notch 570. The use of two hinged fulcrums or portions of a fulcrum, as well as the re-location of pulling notch 570 and push lock 580, may allow additional leverage to be applied while advancing and/or extracting the internal closure (e.g., internal closure 100 in FIG. 1) with respect to the container (e.g., container 100). The use of two hinged fulcrums may further prevent potential interference between the application of the push lock 580 against the collar (e.g., collar 160) of the container in one operation (e.g., the step described in FIG. 3B) and the application of one or both of upper pulling notch 570 and lower pulling notch 575 against the top surface of the container in another operation (e.g., the step described in FIG. 3C).

The operations illustrated in FIGS. 3A-3C, with respect to applying a rotational force to an internal closure extraction mechanism to gain hold or purchase on the internal closure (e.g., internal closure 150 in FIG. 1), applying a downward force to break the internal closure-container seal (and advance the internal closure further in to the container), and applying an upward force to remove the internal closure from the container (e.g., container 100), also apply to the operation of internal closure removal device 500. The leverage necessary to advance the internal closure and break the internal closure-container seal is applied downward through the shaft 540 to worm 560 that has hold or purchase on the internal closure with the ram 590 resting on the top surface of the internal closure. Further, the step described in FIG. 3C may be repeated after re-positioning the handle 510 and fulcrum 520 until pulling notch 575 is brought into contact or engaged with the top surface of the container around the opening (e.g., opening 130).

Figure 6A:
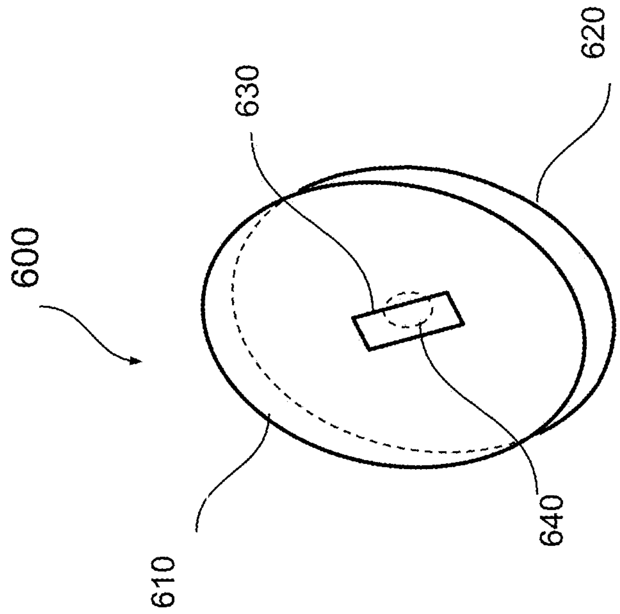
FIGS. 6A and 6B are perspective views of an embodiment of a ram that may be used with an internal closure removal device according to aspects of the present disclosure.
Figure 6B:
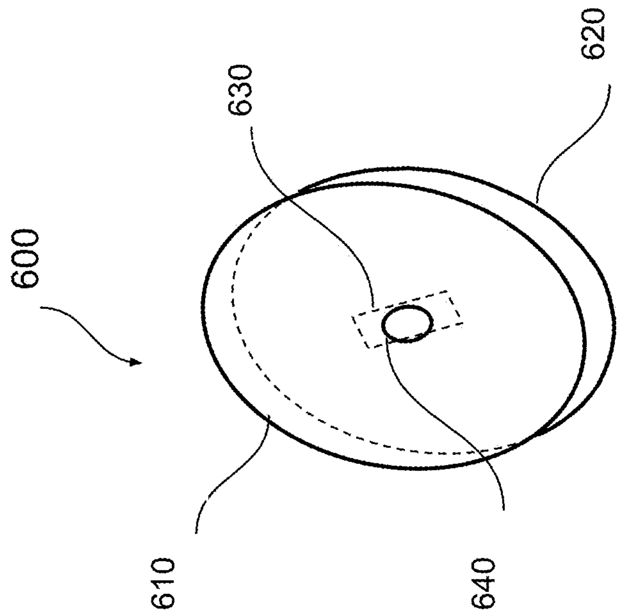

Turning to FIGS. 6A-6B, perspective views of an embodiment of a ram 600 that may be used with an internal closure removal device according to aspects of the present disclosure is shown. Ram 600 used in addition to an internal closure device such as internal closure device 200 illustrated in FIG. 2. may be referred to as a separate, standalone, or free ram. A separate ram 600 also may be added to, attached to, or affixed to, an internal closure device similar to internal closure removal device 200 in FIG. 2, but that does not already include a ram, as shown in FIG. 2. FIG. 6A is an angular perspective view from the side or surface of ram 600 that will be positioned closest to a shaft (e.g., shaft 240) of the internal closure removal device. FIG. 6B is an angular perspective view from the opposite side or surface of ram 600 that will be positioned closest to a worm (e.g., worm 260) of the internal closure removal device. It is worth noting that when permanently affixed or designed as a part of the shaft/worm as in FIG. 2, the ram 600 may be referred to as a fixed ram, fixed cork ram, or fixed cork push. Ram 600 may additionally be added to many other types of existing internal closure removal devices in order to better facilitate applying the necessary downward pressure to an internal closure in a container (e.g., container 100 in FIG. 1) to advance the internal closure (internal closure 150) and break the internal closure-container seal as has been described above. Ram 600 may be formed or constructed out of any suitable material, including the materials described above with respect to constructing internal closure removal device 200.

In the illustrated embodiment, a separate ram 600 has a flat disc shape with an upper surface 610, closest to the shaft (e.g., shaft 240 in FIG. 2), and a lower surface 620, closest to the worm (e.g., worm 260) that are circular in shape. The flat disc shape has diameter similar to, but less than, the diameter of an internal closure, such as illustrated in FIG. 1. In other embodiments, ram 600 may have a different shape as described earlier. An opening or passage through the thickness of ram 600, from in or near the middle of the upper surface 610 to the lower surface 620, large enough to allow the worm or other extraction element included on an internal closure removal device to pass through the ram 600. The shape of the upper opening 630 on the upper surface 610 may be different from the lower opening 640 on the lower surface 620. As illustrated in FIGS. 6A and 6B, the upper 630 is rectangular and may be referred to as a notch. The lower opening 640 is round. The passage through the thickness of ram 600 may be contoured in a manner to provide a transition between the different shapes used for upper opening 630 and lower opening 640. Both upper opening 630 and lower opening 640 are larger than the external diameter of the worm below the shaft. The upper opening 630 is similar in shape to and larger than the shaft which can enter the opening. The lower opening 640 is smaller than the shaft and prevents the shaft from passing through the lower portion of the opening 640. The use of the notch 630 and opening 640 allow the free ram to be easily attached and detached from the worm and shaft of the internal closure removal device.

In FIGS. 6A and 6B, the upper opening 630 is shown as rectangular and the lower opening 640 is shown as round with respect to, and near the midpoint of the upper opening 630 630. In other embodiments, other shapes and orientations for upper opening 630 and lower opening 640 may be used. Additionally, the upper opening 630 and lower opening 640 are shown as passing perpendicular to the surface through the material of ram 600. In other embodiments, the upper opening 630 and/or lower opening 640 may pass through the material at some other predetermined angle, shape or position including an opening from the side of the ram 600 which allows the ram 600 to be engaged with the worm (e.g., worm 260 in FIG. 2) and/or shaft (e.g., shaft 240) laterally. Further, the use of an upper opening 630 and lower opening 640, as shown in FIGS. 6A and 6B, represents only one of several possible implementations for attaching and detaching a ram, such as ram 600, from an internal closure removal device. For example, it may be possible to include a mechanism or structure to allow ram 600 to be attached from the side of the shaft (e.g., shaft 240 in FIG. 2) or to include some type of clamping mechanism to secure ram 600 in place for use. Further, the shaft or the upper region of the worm (e.g., worm 260) closest to the shaft may be shaped to limit further passing of the worm through ram 600 as the free ram is attached to the internal closure device.

Figure 7:
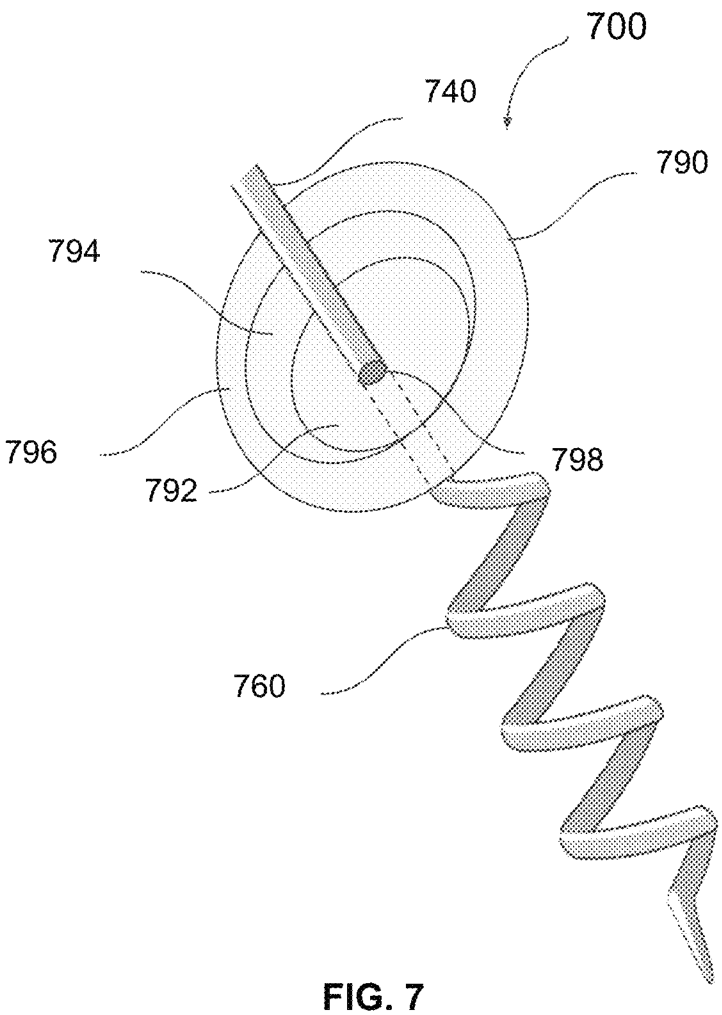
FIG. 7 is a perspective view of a portion of an exemplary corkscrew-type internal closure removal device that includes a ram according to aspects of the present disclosure.

Turning to FIG. 7, a perspective view of a portion of an exemplary internal closure removal device 700 that includes a fixed ram according to aspects of the present disclosure is shown. Internal closure removal device 700 may be similar to internal closure removal device 200 described in FIG. 2. The portion of internal closure removal device 700 includes a ram 790 positioned between a shaft 740 and a worm 760. As shown in FIG. 7, the ram 790 resembles an upside-down top hat having an inner or lower portion 792 (i.e., the crown of the top hat), a transition region 794 (i.e., the band), and an outer or upper portion 796 (i.e., the brim). In other embodiments, other shapes may be used. The lower or inner portion 792 includes a mounting or connecting point 798 (e.g., a hole) near its middle to attach the ram 790 to the shaft 740 at a point above worm 760. The lower portion 792 serves the same purpose as described above for ram 290 in FIG. 2, that is to apply even pressure to the top of the internal closure (e.g., internal closure 150 illustrated in FIG. 1) to break the internal closure-container seal by advancing it into the container (e.g., container 100). The upper portion 796 has an outer diameter that is larger than the diameter of lower surface 720 and is used as an insertion limiting device or limiter that makes contact against the top surface of a container opening (e.g., opening 130), as described above. It is worth noting that the use of an insertion limiting device on a ram, such as ram 790 illustrated in FIG. 7, may further improve the control of the downward force applied to break the internal closure-container seal, as described above, in the absence of a push lock (e.g., push lock 280 in FIG. 2) or similar container grasping mechanism.

Figure 8:
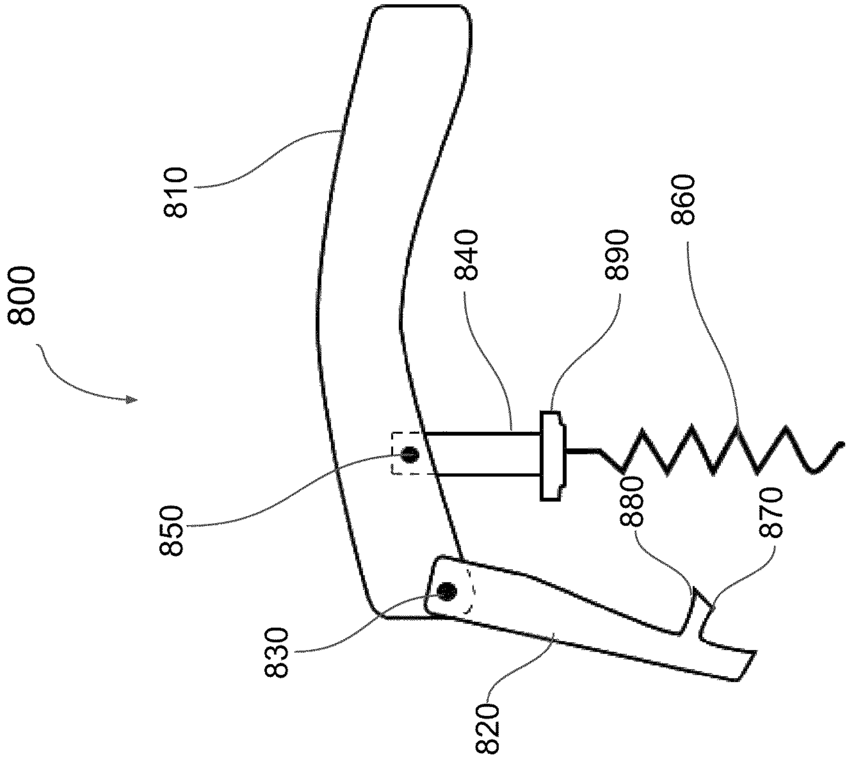
FIG. 8 is a perspective view of a further exemplary embodiment of an internal closure removal device according to aspects of the present disclosure.

Turning to FIG. 8, a perspective view of a further exemplary embodiment of an internal closure removal device 800 according to aspects of the present disclosure is shown. The internal closure removal device 800 operates in a manner similar to the internal closure removal device 200 described in FIG. 2. As such, except as described below, the structure, orientation, and operation of elements 810, 820, 830, 840, 850, and 860, 870, 880, and 890 are similar to elements 210, 220, 230, 240, 250, and 260, 270, 280, and 290 described in FIG. 2 and will not be described in further detail here.

Internal closure removal device 800 illustrates an alternate arrangement or orientation of pulling notch 870 and push lock 880 with respect to FIG. 2. Push lock 880 is positioned closer to the pivot point 830 than pulling notch 870, an orientation similar to that described in FIG. 5. Additionally, both pulling notch 870 and push lock 880 are positioned closer to the end fulcrum 820 furthest from handle 810 and pivot point 830. The change in position results in a change in the relative orientation of the handle 810 and fulcrum 820 during operation of one or more of the steps described in FIG. 3A-3C and may be advantageous in some uses.

It is worth noting that, as shown, push lock 880 and pulling notch 870 are implemented or formed as a part of the same notch or step as described above. The shape of the notch or step is asymmetrical, with the edge used for push lock 880 extending further from the fulcrum 820 than the edge used for pulling notch 870. The use of the asymmetrical shape may prevent potential interference between the application of the push lock 880 against the collar (e.g., collar 160 in FIG. 1) of the container (e.g., container 100) in one operation (e.g., the step described in FIG. 3B) and the application of pulling notch 870 against the top surface of the container in another operation (e.g., the step illustrated in FIG. 3C).

The operations described in FIGS. 3A-3C with respect to applying a rotational force to engage an internal closure extraction mechanism into the internal closure (e.g., internal closure 150 in FIG. 1), applying a downward force to break the internal closure-container seal and advance the internal closure, and applying an upward force to remove the internal closure from the container (e.g., container 100) also apply to the operation of internal closure removal device 800. The leverage necessary to advance the internal closure and break the internal closure-container seal is applied downward through the shaft 840 to worm 860 that is embedded or engaged in the internal closure with the ram 890 resting on the top surface of the internal closure.

Figure 9:
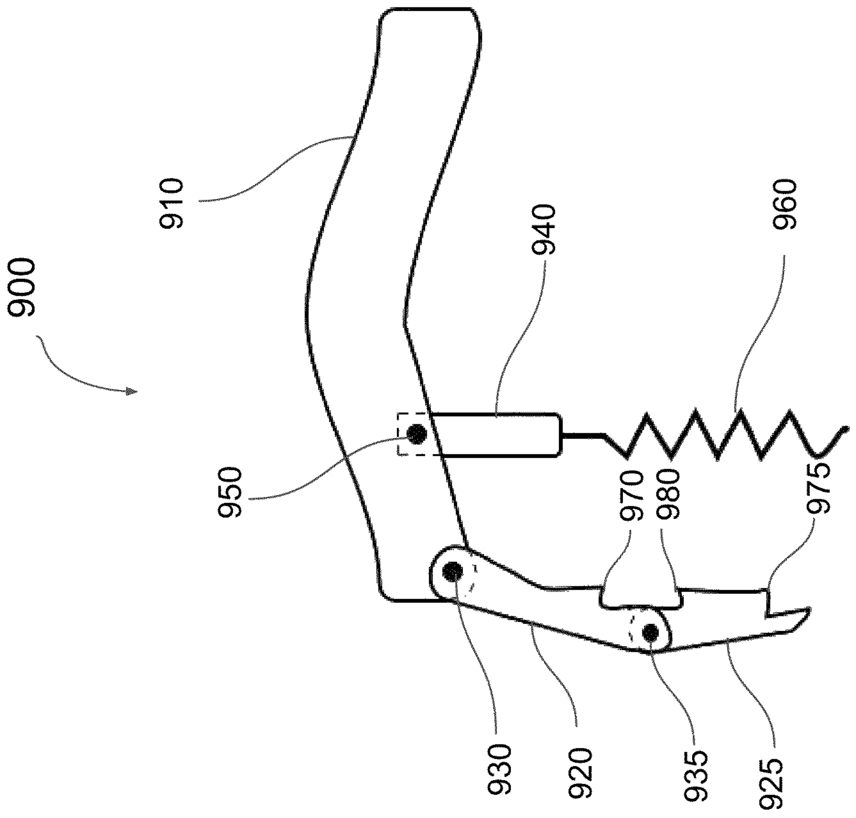
FIG. 9 is a perspective view of yet another exemplary embodiment of an internal closure removal device according to aspects of the present disclosure.

Turning to FIG. 9 is a perspective view of yet another exemplary embodiment of an internal closure removal device according to aspects of the present disclosure. The internal closure removal device in FIG. 9 is similar to the internal closure removal device described in FIG. 5. As such, except as described below, the structure, orientation, and operation of elements 910, 920, 925, 930, 935, 940, 950, 960, 970, 975, and 980 are similar manner to elements 510, 520, 535, 530, 535. 540, 550, 560, 570, 575, and 580 illustrated in FIG. 5 and will not be described in further detail here. Internal closure removal device 900 includes only a push lock 980 and does not include a ram similar to ram 590 illustrated in FIG. 5 included on shaft 940.

Internal closure removal device 900 illustrates an alternate arrangement or orientation of upper pulling notch 970 and push lock 980 with respect to FIG. 4. Upper pulling notch 970 is positioned closer to the pivot point 930 than push lock 980, an orientation similar to that described in FIG. 2. Additionally, push lock 980 is included on lower fulcrum 935 rather than on upper fulcrum 930. Further, push lock 980 and lower pulling notch 975 are implemented or formed as a part of the same notch or step as described above. However, the length of the notch or step that is parallel to the edge of fulcrum 920 is elongated in order to maintain a sufficient distance between push lock 980 and lower pulling notch 975 as part of operation. The change in position and location results in a change in the relative orientation of the handle 910, upper fulcrum 920, and lower fulcrum 925 during operation of one or more of the steps described in FIG. 3A-3C and may be advantageous in some uses.

In FIG. 9, push lock 980 is shown positioned along the edge of the lower fulcrum 925 that is intended to be nearest to the container (e.g., container described in FIG. 1). Push lock 980 is located within the middle area of lower fulcrum 925 and spaced a distance away from the pulling notch 970 located on upper fulcrum 920. Further, depending on the relative lengths of upper fulcrum 920 and lower fulcrum 925, both push lock 980 and pulling notch 970 may be located on upper fulcrum 920. For instance, the location of push lock 980 may be closer to lower pivot point 935 than pulling notch 970.

The operations described in FIGS. 3A-3C with respect to applying a rotational force to engage an internal closure extraction mechanism into the internal closure (e.g., internal closure 150 in FIG. 1), applying a downward force to break the internal closure-container seal and advance the internal closure, and applying an upward force to remove the internal closure from the container (e.g., container 100) also apply to the operation of internal closure removal device 800. The leverage necessary to advance the internal closure and break the internal closure-container seal is applied downward through shaft 940 to worm 960 that is embedded or engaged in the internal closure. Further, the step illustrated in FIG. 3C may be repeated to re-position handle 910 and fulcrum 920 until pulling notch 975 is brought into contact or engaged with the top surface of the container around the opening (e.g., opening 130). In some embodiments, a separate, removable free ram, such as ram 600 shown in FIGS. 6A and 6B, or a fixed ram, such as shown in FIG. 7, may be attached to the shaft 940 at a location similar to that shown for ram 590 in FIG. 5 if additional leverage on the internal closure is necessary or desired or in order to prevent or mitigate damage (e.g., fracturing, splitting, avulsion) to the internal closure.

Figure 10:
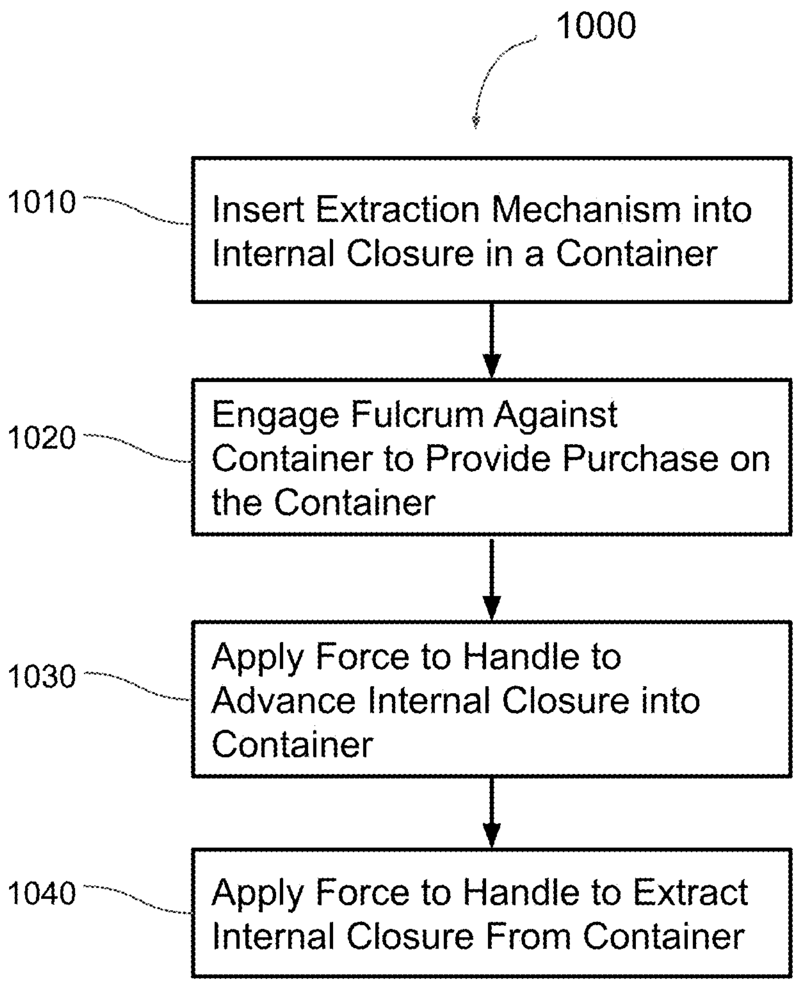
FIG. 10 is a flow chart of an exemplary process for extracting an internal enclosure from a container according to aspects of the present disclosure.

Turning to FIG. 10, a flow chart of an exemplary process 1000 for extracting an internal closure from a container according to aspects of the present disclosure. Process 1000 will be primarily described with respect to internal closure removal device 200, illustrated in FIG. 2. Process 1000 may also be used in conjunction with other user-operated internal closure removal devices that include one or more of the aspects of the present disclosure, such as the internal closure removal devices described in FIGS. 5, 8, and 9. It is worth noting that process 1000 may be adapted and used with specific types of containers and internal closures, such as a bottle and a cork. Further, some or all of process 1000 may be applied to a mechanized and/or automated internal closure removal device such as was described above.

At step 1010, an internal closure extraction mechanism (e.g. worm 260 in FIG. 2) is inserted into internal closure (e.g., internal closure 150 in FIG. 1) in a container (e.g., container 100). The internal extraction mechanism is attached to the handle (e.g., handle 210) of the internal closure removal device. In order to insert the internal closure extraction mechanism, the handle may be positioned over the top of the opening (e.g., opening 130) and rotated with a force to drive the leading edge of the worm into the internal closure in a manner similar to that described in FIG. 3A. Other embodiments, using different internal closure extraction mechanisms, may utilize different insertion techniques. The internal extraction mechanism used provides sufficient purchase or hold on the internal closure to allow additional linear force to be applied to the internal closure with respect to the opening in the container.

At step 1020, a fulcrum (e.g., fulcrum 220 in FIG. 2) that is attached to the handle of the internal closure removal device is engaged against the container (e.g., container 100 in FIG. 1). The fulcrum is engaged against the container to provide purchase, hold, or grasp on the container. In some embodiments, the fulcrum may use a container grasping mechanism to engage against the container. For example, the fulcrum may include a push lock (e.g., push lock 280). The push lock may be configured to provide purchase on a collar (e.g., collar 160) located near the opening (e.g., opening 130) on the container, as illustrated in FIG. 3B. Other container grasping mechanisms may also be used as described above.

At step 1030, a force is applied to the handle (e.g., handle 210) of the internal closure removal device in the direction of the container opening to break the internal closure-container bond with resultant advancement of the internal closure (e.g., internal closure 150 in FIG. 1) into the container (e.g., container 100). The force is applied to the handle, at step 1030, while the fulcrum is engaged against the container as described at step 1020. The force applied, at step, 1030, is transferred to the internal closure. In some embodiments, the applied force is transferred through the shaft (e.g., shaft 240) to the worm (e.g., worm 260) of the internal closure removal device to advance the internal closure, as described in FIG. 3B. The force applied, at step 1030 is sufficient to break the bond or seal that has formed between the outer surface of the internal closure and the inner surface of the container as described above. The required distance of advancement of the internal closure is small, in some cases no more than one mm. As described above, if the internal closure is advanced too far into the container, the internal closure may be more difficult to extract.

In some embodiments, the internal closure extraction mechanism may include a mechanism to assist with the uniform application of the force to the internal closure (e.g., internal closure 150 in FIG. 1) and prevent or mitigate damage to the internal closure, such as fracturing, splitting, or avulsion. In some embodiments, the internal closure push mechanism may be a ram (e.g., ram 290). The ram may be attached to the shaft (e.g., shaft 240) at a point near the end of the worm (e.g., 260). The ram may be a standalone or free ram that may be detachable, such as that shown in FIGS. 6A and 6B, or fixed as shown in FIG. 7. The ram may further include a limiter used to prevent excess advancement of the internal closure into the container, as described above.

At step 1040, a force is applied to the handle (e.g., handle 210) to extract the internal closure (e.g., internal closure 150 in FIG. 1) from the container (e.g., container 100). The force is applied to the handle, at step 1040, while the fulcrum (e.g., fulcrum 220) is engaged against the container as illustrated at step 1020. The force applied, at step 1040, is transferred to the internal closure extraction mechanism to extract the internal closure in a direction opposite the force applied at step 1030. In other words, the force applied, at step 1040, is in a direction away from the opening (e.g., opening 130) of the container. In some embodiments, the applied force is transferred through the shaft (e.g., shaft 240) to the worm (e.g., worm 260) of the internal closure removal device to the internal closure, as illustrated in FIG. 3C. In some embodiments, the handle and fulcrum may be adjusted using a pivot point (e.g., pivot point 230) between them as well as a hinged connection (e.g., hinged connection 250) between the handle and the shaft until a pulling notch (e.g., pulling notch 270) is brought into contact or engaged against the top surface of the container around the opening.

It is worth noting that one or more of the steps of process 1000 may be modified, added, or omitted depending on a specific embodiment. In some embodiments, the engagement of the fulcrum (e.g., fulcrum 220) against the container, at step 1020, may be omitted, and the forces applied to the handle, at steps 1030 and 1040 may be performed without the use of a fulcrum engaged against the container. In some embodiments, the application of force to extract the internal closure from the container, at step 1040 may be repeated in order to completely extract or pull out the internal closure from the container. In some embodiments, using an internal closure removal device similar to that illustrated in FIG. 5 or FIG. 9, each of the repeated steps 1040 may also include a re-adjustment of the relative positions of the handle, fulcrum, and shaft as described above.

Figure 11B:
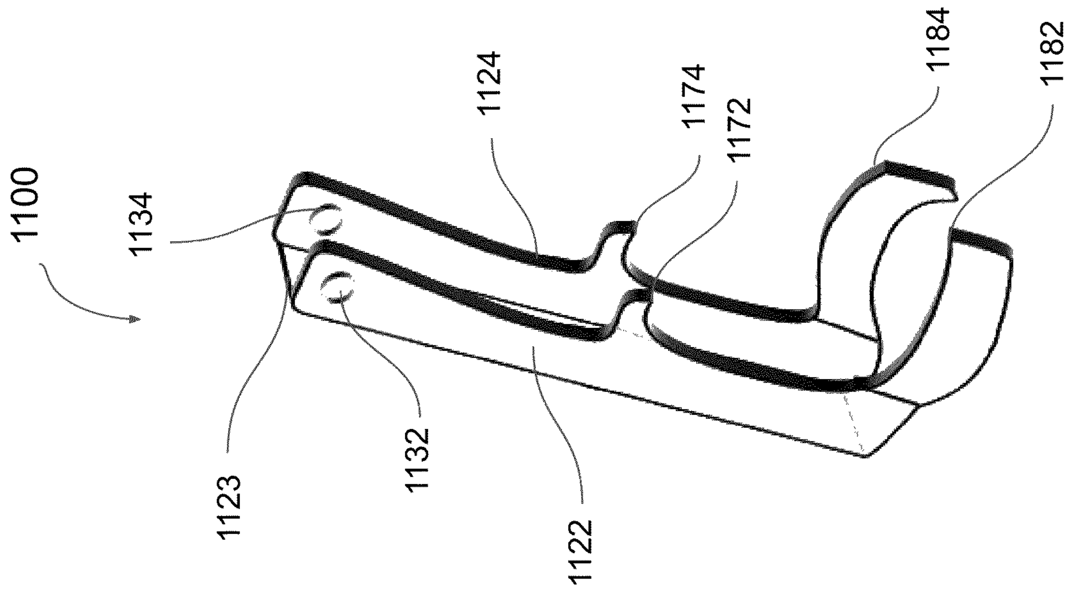
FIGS. 11A and 11B are two perspective views of another exemplary embodiment of a fulcrum included as part of an internal closure removal device according to aspects of the present disclosure.
Figure 11A:
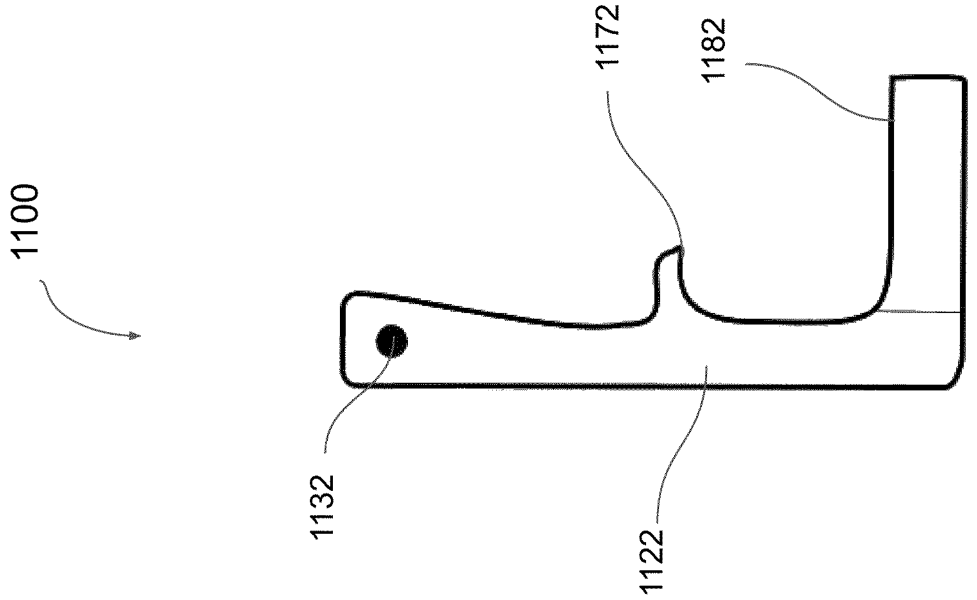

Turning to FIGS. 11A and 11B, two perspective views of another exemplary embodiment of a fulcrum 1100 included as part of an internal closure removal device according to aspects of the present disclosure are shown. Fulcrum 1100 is formed in a manner similar to fulcrum 400 described in FIG. 4. As such, except as described below, the structure, orientation, and operation of elements 1122, 1123, 1124, 1132, 1134, 1172, and 1174 are similar manner to elements 422, 423, 424, 432, 434, 472, and 474 illustrated in FIG. 4 and will not be described in further detail here. FIG. 11A is a front side perspective view of fulcrum 1100 showing only front side fulcrum portion 1122 along with opening 1132, pulling notch portion 1172, and push lock portion 1182. FIG. 11B is an angular perspective view of fulcrum 1100, similar to FIG. 4. Fulcrum 1100 includes an alternate type of push lock, shown as push lock portions 1182 and 1184. The push lock portions 1182 and 1184 form a partial ring that is configured to wrap around a circular segment of the upper portion (e.g., upper structure 120 in FIG. 1) of a container (e.g., container 100) at a point below or under the collar (e.g., collar 130). The push lock portions 1182 and 1184 engage with the lower edge of the collar in a manner similar to push lock 280, illustrated in FIG. 2. Push lock portions 1182 and 1184 may provide additional contact area to a circular-shaped collar, improving the engagement between fulcrum 1100 and the container as used in the step illustrated in FIG. 3B or at step 1020 in FIG. 10.

It is to be appreciated that, except where explicitly indicated in the description above, the various features shown and described above in the figures are interchangeable. That is, a feature shown in one embodiment may be incorporated into another embodiment.

Although embodiments that incorporate the teachings of the present disclosure have been shown and described in detail herein, those skilled in the art can readily devise many other varied embodiments that still incorporate these teachings. Having described preferred embodiments of an apparatus and method for removing an internal closure from a container, it is noted that modifications and variations can be made by persons skilled in the art, in light of the above teachings. It is, therefore, to be understood that changes may be made in the particular embodiments of the disclosure which are within the scope of the disclosure.

The invention claimed is:

1. An apparatus comprising:

a handle;

a fulcrum, the fulcrum mechanically coupled, at one end, to one end of the handle through a pivot point, the pivot point allowing rotational freedom along an orthogonal axis between the handle and fulcrum, the fulcrum including a pulling notch formed along a length dimension of the fulcrum, the pulling notch having a lower edge that is substantially perpendicular to the length dimension and having a span configured to engage a top surface of a container; and an internal closure extraction mechanism mechanically coupled to the handle, the internal closure extraction mechanism configured to extract an internal closure out of an opening in a container when the pulling notch is engaged to the top surface of the container and a force is applied to the handle in a direction away from the opening in the container, the internal closure sealing the container after the container is filled with material;

wherein the fulcrum includes a push lock formed along the length dimension of the fulcrum, the push lock having an upper edge that extends away from the fulcrum substantially perpendicular to the length dimension and having a span, the push lock further having a distal edge starting at a point of the upper edge furthest from the fulcrum and extending toward the fulcrum, the point between the upper edge and the distal edge forming a point having an acute angle, the span and the point between the upper edge and the distal edge configured to provide purchase on at least a portion of a lower edge of a collar located near the opening of the container, allowing a force to be applied to the handle in a direction to advance the internal closure into the container prior to extracting the internal closure from the container.

2. The apparatus of claim 1, wherein the location of the push lock on the fulcrum is closer to the pivot point with the handle than the location of the at least one pulling notch.

3. The apparatus of claim 1, wherein the internal closure extraction mechanism is a worm assembly, the worm assembly having a straight portion and a helical portion, a first end of the straight portion mechanical coupled to the handle through a second pivot point allowing rotational freedom along an orthogonal axis between the handle and fulcrum, a second of the straight portion mechanically coupled to a first end of the helical portion, and a second end of the helical portion configured to be driven into the internal closure when a rotational force is applied to the handle, the worm assembly including a ram mechanically coupled to the worm assembly at the first end of the helical portion, the ram configured to apply the force in the direction to advance the internal closure into the container over at least a portion of a top surface of the internal closure.

4. The apparatus of claim 3, wherein the top surface of the internal closure is circular in shape, and the ram is circular in shape having a diameter that is less than the diameter of the internal closure.

5. The apparatus of claim 3, wherein the ram has an inner portion configured to extend over the at least a portion of the internal enclosure and an outer portion configured to extend further outward an annular distance that is greater than the diameter of the opening of the container at a distance to the first end of straight portion that is less than the distance between the inner portion to the first end of the straight portion, the outer portion of the ram configured to contact an upper lip of the container during the advance of the internal closures thereby stopping the advance of the internal closure into the container.

6. The apparatus of claim 5, wherein the outer portion of the ram stops the advance of the internal closure after the internal closure has been advanced one millimeter into the container.

7. The apparatus of claim 3, wherein the ram includes an attachment mechanism configured for attaching and detaching the ram from the worm assembly.

8. The apparatus of claim 1, wherein the fulcrum includes a first portion located closest to the pivot point coupled to the handle and a second portion located further from the pivot point coupled to the handle than the first portion, the first portion and the second portion mechanically coupled through a third pivot point, the third pivot point allowing at least partial angular rotational freedom between the first portion and second portion along an orthogonal axis between the handle and fulcrum.

9. The apparatus of claim 8, wherein the first portion of the fulcrum includes a first pulling notch and the second portion of the fulcrum includes a second pulling notch.

10. The apparatus of claim 1, wherein the force applied to advance the internal closure into the container breaks a seal between an outer surface of the internal closure and an inner surface of the container.

11. The apparatus of claim 1, wherein the internal closure is a cork, and the container is a bottle.

12. A method comprising:

inserting an extracting mechanism into an internal closure located in an opening of a container, the extraction mechanism attached to a handle, the handle being positioned above the opening;

advancing the internal closure including the inserted extraction mechanism into the container, the advancement including providing purchase against a portion of a collar located near the opening of the container using a push lock of a fulcrum to and applying a first force to the handle in a direction towards the container, the advancement breaking the seal between the internal closure and the container, the fulcrum being attached to one end of the handle; and extracting the internal closure including the inserted extraction mechanism from the container, the extraction including engaging a pulling notch on the fulcrum with a top surface of the container and applying a second force to the handle in a direction opposite the first force, the second force allowing the extraction mechanism to extract the internal closure from the container.

13. The method of claim 12, wherein the first force applied to advance the internal closure breaks a seal between an outer surface of the internal closure and an inner surface of the container.

14. The method of claim 12, wherein the first force is applied until the internal closure has been advanced one millimeter into the container.

15. The apparatus of claim 1, wherein the span of the pulling notch is less than the diameter of the opening and the span of the push lock is greater than the diameter of the opening.

16. An apparatus comprising:

a handle;

a fulcrum, the fulcrum mechanically coupled, at one end, to one end of the handle through a pivot point, the pivot point allowing rotational freedom along an orthogonal axis between the handle and fulcrum; and A worm assembly mechanically coupled to the handle, the worm assembly having a straight portion and a helical portion, a first end of the straight portion mechanical coupled to the handle through a second pivot point allowing rotational freedom along an orthogonal axis between the handle and fulcrum, a second of the straight portion mechanically coupled to a first end of the helical portion, and a second end of the helical portion configured to be driven into the internal closure when a rotational force is applied to the handle, the worm assembly configured to extract an internal closure out of an opening in a container when a force is applied to the handle in a direction away from the opening in the container, the internal closure sealing the container after the container is filled with material;

wherein the fulcrum includes a container hold mechanism, the container hold mechanism configured to provide purchase on the container, allowing a force to be applied to the handle in a direction to advance the internal closure into the container prior to extracting from the container, and wherein the worm assembly includes a ram mechanically coupled to the worm assembly at the first end of the helical portion, the ram configured to apply the force in the direction to advance the internal closure into the container over at least a portion of a top surface of the internal closure.

17. The apparatus of claim 15, wherein the top surface of the internal closure is circular in shape, and the ram is circular in shape having a diameter that is less than the diameter of the internal closure.

* * * * *